United States Patent [19]
Gabbert et al.

[11] Patent Number: 4,595,746
[45] Date of Patent: Jun. 17, 1986

[54] PROMOTION OF ε-CAPROLACTAM POLYMERIZATION WITH LACTAM MAGNESIUM HALIDE CATALYST AND 2-OXO-1-PYRROLIDINYL GROUPS

[75] Inventors: James D. Gabbert, Wilbraham, Mass.; Ross M. Hedrick, St. Louis, Mo.

[73] Assignee: Monsanto Company, St. Louis, Mo.

[21] Appl. No.: 682,717

[22] Filed: Dec. 17, 1984

[51] Int. Cl.$^4$ ............................................. C08G 69/20
[52] U.S. Cl. ..................................... 528/312; 502/167; 502/169; 525/419; 525/420; 525/425; 525/432; 525/437; 528/313; 528/315; 528/318; 528/319; 528/323
[58] Field of Search ............... 528/312, 313, 315, 318, 528/319, 323; 525/419, 420, 425, 432, 437; 502/167, 169

[56] References Cited

U.S. PATENT DOCUMENTS

| | | |
|---|---|---|
| 3,017,391 | 1/1962 | Mottus et al. ........................ 528/312 |
| 3,220,983 | 11/1965 | Schmidt et al. ........................ 260/78 |
| 3,562,221 | 2/1971 | Steinhofer et al. .................... 528/312 |
| 3,585,171 | 6/1971 | Steinhofer et al. .................... 528/312 |
| 3,644,264 | 2/1972 | Hyde .................................... 528/312 |
| 3,862,262 | 1/1975 | Hedrick et al. ....................... 260/857 |
| 4,223,112 | 9/1980 | Hedrick et al. ....................... 525/432 |
| 4,303,778 | 12/1981 | Kralicek et al. ...................... 528/312 |
| 4,507,465 | 3/1985 | Chiba et al. .......................... 528/312 |

OTHER PUBLICATIONS

English language translation of Kokai 100; Ogasa et al.; Jun. 9, 1984.

English language translation of French Patent Application 2322165; Dewens et al.

Primary Examiner—Harold D. Anderson
Attorney, Agent, or Firm—Nancy J. Linck; R. Bruce Blance; William J. Farrington

[57] ABSTRACT

A process for polymerizing ε-caprolactam to form a nylon-6 polymer in which a reactant stream containing ε-caprolactam and a lactam polymerization initiator is brought into polymerizing admixture with a reactant stream containing ε-caprolactam and a lactam magnesium halide, wherein sufficient 2-oxo-1-pyrrolidinyl compound is added to the admixture either as 2-pyrrolidinone, 2-oxo-pyrrolidinyl magnesium halide or 2-oxo-1-pyrrolidinyl capped initiator compound to enhance the rate of polymerization of the ε-caprolactam.

38 Claims, No Drawings

PROMOTION OF ε-CAPROLACTAM POLYMERIZATION WITH LACTAM MAGNESIUM HALIDE CATALYST AND 2-OXO-1-PYRROLIDINYL GROUPS

The present invention is directed to polymerizable ε-caprolactam compositions, to polymerized products therefrom and to a process for polymerization thereof. In particular it is directed to components of such polymerizable ε-caprolactam compositions containing a sufficient amount of 2-oxo-1-pyrrolidinyl compounds to promote the rate of polymerization.

It is known that lactams in general, and specifically caprolactam, may be polymerized by heating in the presence of suitable anionic polymerization catalysts among which are the alkali metals and alkaline earth metals and such of their compounds as are capable of forming an active iminium salt with a lactam. In recent years, it has been found that certain classes of activated ring compounds such as those possessing lactam rings attached to electron withdrawing groups such as carbonyl groups are capable of initiating the polymerization of lactam when used in conjunction with such anionic catalysts. The polymerization rate may be affected by the temperature at which the reaction is conducted, and the concentration of such initiators and catalysts. While the rate of lactam monomer polymerization may be generally rapid when using an initiator in conjunction with an anionic catalyst, it is desirable to increase this rate even more, especially in transfer molding and reaction injection molding systems.

The present invention is directed to a process for the preparation of a nylon-6 polymer from ε-caprolactam in which the rate of polymerization of the ε-caprolactam is promoted by the inclusion of 2-oxo-1-pyrrolidinyl compounds in the polymerization medium and is directed to the reaction mixture containing such 2-oxo-1-pyrrolidinyl compounds. Other aspects of this invention are directed to the reactant streams containing 2-oxo-1-pyrrolidinyl compounds which can be used in the polymerization process.

More particularly the process comprises bringing into polymerizing admixture a first reactant stream comprising ε-caprolactam, an effective amount of an ε-caprolactam polymerization initiator or precursor thereof and optionally 2-pyrrolidinone and a second reaction stream comprising ε-caprolactam, a catalytically effective amount of a $C_3$ to $C_{12}$ lactam magnesium halide and optionally 2-pyrrolidinone. Hereinafter, for the purposes of this disclosure, the terms "initiator coreactant" and "initiator" are used interchangeably. The ε-caprolactam polymerization initiator is preferably a compound capped with at least one activated $C_3$ to $C_{12}$ N-lactam group capable of initiating ε-caprolactam polymerization in the presence of the catalyst, and the precursor is capable of reacting with ε-caprolactam to form such an initiator species. The polymerizing admixture comprises a sufficient amount of 2-oxo-1-pyrrolidinyl compounds selected from the group consisting of 2-pyrrolidinone, 2-oxo-1-pyrrolidinyl magnesium halide and 2-oxo-1-pyrrolidinyl capped initiator compound to provide a concentration of 2-oxo-1-pyrrolidinyl group in the range of about 0.05 to about two equivalents per equivalent of the total ε-caprolactam polymerization initiator coreactant or precursor thereof.

The first reactant stream used in the process can comprise (a) ε-caprolactam, (b) an effective amount of the initiator coreactant compound or precursor thereof, and (c) a sufficient amount of 2-oxo-1-pyrrolidinyl groups, present in the composition as 2-pyrrolidinone or as N-lactam groups of the initiator compound, to provide a concentration of 2-oxo-1-pyrrolidinyl groups in the range of about 0.05 to about two equivalents per equivalent of the initiator compound or precursor thereof.

The second reactant stream can comprise ε-caprolactam, a catalytically effective amount of a lactam magnesium halide of a $C_3$ to $C_{12}$ lactam, and a sufficient amount of 2-oxo-1-pyrrolidinyl groups present in the composition as 2-pyrrolidinone or as 2-oxo-1-pyrrolidinyl magnesium halide to provide in the admixture a concentration of 2-oxo-1-pyrrolidinyl groups in the range of about 0.05 to about two equivalents per equivalent of the initiator compound or precursor thereof supplied in the first reactant stream.

The reaction admixture formed in the process comprises ε-caprolactam, an effective amount of an ε-caprolactam polymerization initiator coreactant, or precursor thereof, a catalytically effective amount of a $C_3$ to $C_{12}$ lactam magnesium halide and optionally 2-pyrrolidinone, wherein the ε-caprolactam polymerization initiator coreactant is a compound capped with at least one activated $C_3$ to $C_{12}$ N-lactam group capable of initiating ε-caprolactam polymerization in the presence of the catalyst, wherein the admixture comprises a sufficient amount of 2-oxo-1-pyrrolidinyl compounds selected from the group consisting of 2-pyrrolidinone, 2-oxo-1-pyrrolidinyl magnesium halide and 2-oxo-1-pyrrolidinyl capped initiator coreactant compound to provide a concentration of 2-oxo-1-pyrrolidinyl group in the range of about 0.05 to about two equivalents of the total ε-caprolactam polymerization initiator coreactant or precursor thereof and wherein, when the initiator compound is a polyacyllactam of molecular weight less than 400 and the catalyst is 2-oxo-1-pyrrolidinyl magnesium halide, at least 10 percent of the 2-oxo-1-pyrrolidinyl groups are supplied by 2-pyrrolidinone or by the initiator coreactant compound, or there is present at least about 0.55 equivalents of 2-oxo-1-pyrrolidinyl magnesium halide per equivalent of initiator coreactant compound.

The lactam polymerization initiator useful for the practice of the present invention is generally a compound which has been prepared so as to possess at least one activated group which initiates ε-caprolactam polymerization. For the purposes of this disclosure, the terms "initiator coreactant" and "initiator" are used interchangeably. Advantageously the activated group is a $C_3$ to $C_{12}$ N-lactam ring preferably derived from ε-caprolactam or 2-pyrrolidinone and indeed may be exclusively derived from 2-pyrrolidinone. Activation is generally obtained by attaching the lactam group through the nitrogen atom to a moiety selected from the group consisting of

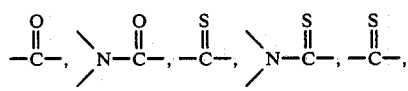

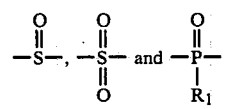

where $R_1$ is selected from the group consisting of alkyl, aryl, aralkyl, alkyloxy, aryloxy or aralkyloxy groups. The lactam polymerization initiator may be prepared either prior to its addition to the first reactant stream or in situ of the first reactant stream. For example, the initiator may be formed by the reaction of ε-caprolactam with a compound possessing acid halide groups, for example, —COCl, —CSCl and —SO$_2$Cl, or haloformate groups such as —OCOCl, or ketene groups, or isocyanate groups or cyclic imide groups. Particularly preferred precursors for reaction with ε-caprolactam are those compounds possessing acid halide or isocyanate groups.

Generally the molecular weight of the lactam polymerization initiator coreactant is less than 1000. Advantageously the compounds from which the lactam polymerization initiator is derived are lower molecular weight alkyl, aryl, alkyloxy, aryloxy, aralkyl, and aralkyloxy compounds. Examples of suitable compounds from which the lactam polymerization initiator in accordance with the present invention may be derived are mono- or polycarboxylic acids, such as acetic, benzoic, carbonic, oxalic, glutaric, adipic, pimelic, azelaic, sebacic, isophthalic, terephthalic or other equivalent acids which have been reacted so as to possess lactam initiator groups or one of the precursor groups discussed above which when subsequently reacted with lactam monomer either prior to or during the polymerization reaction form the lactam initiator group. The preferred lactam polymerization initiators are derived from the mono- or polycarboxylic acids. By "lower molecular weight" it is meant the compound from which the lactam polymerization initiator is derived has an actual molecular weight of less than about 300 and, preferably, from about 40 to about 200.

Generally, the functionality or number of activated groups, i.e. equivalents per molecule of lactam polymerization initiator will be selected to provide a suitable reaction rate. The functionality is at least 1 but polyfunctional lactam polymerization initiators with functionality in the range of 2 to 9 and preferably in the range of 3 to 7, can be used to advantage in the polymerization of the lactam.

When the lactam polymerization initiator is used to prepare nylon polymers by the reaction with ε-caprolactam monomer in the presence of a suitable catalyst, the resulting nylon polymer is generally comprised of the lactam polymerization initiator to which are attached polyamide chains having repeat units of the general structure: (—CO—Y—NH—) wherein Y is a pentamethylene group. While the nylon polymer is essentially prepared from ε-caprolactam, other lactam monomers may be included so long as the reaction rate or degree of caprolactam polymerization is not substantially impaired. The weight-average molecular weight of the resulting polyamide may vary widely and is advantageously in the range from about 18,000 to about 100,000. The molecular weight is generally dependent upon the molar ratio of caprolactam monomer and lactam polymerization initiator. Generally, the amount of lactam polymerization initiator used is at least about 0.1 mole percent of the total molar amount of caprolactam monomer used, and more preferably, from 0.25 to 1.0 mole percent.

The polymerization of the caprolactam monomer may be carried out in the presence of other materials such as hydroxy functional polymers and polyols, wherein a polyfunctional lactam polymerization initiator is caused to react with the hydroxy functional polymers or polyol during the polymerization of the caprolactam monomer to provide a nylon block copolymer. Such a method of preparing a nylon block copolymer is generally disclosed in U.S. Pat. No. 4,031,164, which is incorporated herein by reference. To avoid adversely affecting the rate of polymerization, the initiator compound should be present in stoichiometric excess over the hydroxy functional polymer and should preferably be present in a range of about 1.1 to about 2 equivalents per equivalent of hydroxy functional polymer.

The magnesium catalyst for the lactam polymerization is a $C_3$ to $C_{12}$ lactam magnesium halide, preferably derived from lactam selected from the group consisting of ε-caprolactam and 2-pyrrolidinone and more preferably it is selected from ε-caprolactam magnesium bromide, (2-oxo-1-tetrahydroazepinyl magnesium bromide), and 2-pyrrolidinone magnesium bromide, (2-oxo-1-pyrrolidinyl magnesium bromide). The amount of catalyst used is an amount which gives an appreciable rate of polymerization. Advantageously, the amount of magnesium lactam polymerization catalyst for the practice of the present invention is in the range of 0.3 to 1.6 mole percent based on the total molar amount of ε-caprolactam monomer, and preferably, from about 0.6 to about 1.2 mole percent. The reaction rate is dependent upon the concentration of catalyst being used and other parameters such as the temperature at which the reaction is being carried out.

In general, even a minimal amount of 2-oxo-1-pyrrolidinyl groups in the reaction admixture of lactam, lactam polymerization initiator and lactam polymerization catalyst is effective in increasing the polymerization rate. The 2-oxo-1-pyrrolidinyl compounds can be any one of 2-pyrrolidinone, initiator compound capped with 2-oxo-1-pyrrolidinyl groups and 2-oxo-1-pyrrolidinyl magnesium halide and can therefor be added in the lactam initiator solution or in the catalyst stream or in both. Preferably all the 2-oxo-1-pyrrolidinyl compound is added in the initiator stream and more preferably it is all present as 2-oxo-1-pyrrolidinyl capped initiator. In contrast to 2-pyrrolidinone, other derivatives of pyrrolidinone such as N-methyl-2-pyrrolidinone and 5-methyl-2-pyrrolidinone provided no accelerating effect.

Generally, an accelerating amount of 2-oxo-1-pyrrolidinyl compound is sufficient for the purpose of the invention. An "accelerating amount" is an amount which is sufficient to provide an increase in lactam polymerization rate which can be conveniently demonstrated by a decrease in reaction exotherm time as described hereinbelow. Preferably, the "accelerating amount" will be an amount sufficient to provide an overall decrease of at least 10 percent in the adiabatic polymerization exotherm time in comparison with an admixture containing no 2-oxo-1-pyrrolidinyl compounds. Advantageously, the amount of 2-oxo-1-pyrrolidinyl groups is in the range of about 0.05 equivalent to about 2 equivalents per equivalent of lactam initiator and, more preferably, from about 0.2 to about 1 equivalent per equivalent of lactam initiator.

The reaction rate of lactam monomer polymerization can be determined from the exotherm of the reaction by one of the following methods:

I. Standard Exotherm A 30 gauge iron constantan thermocouple connected to a recording potentiometer, is positioned within a mold. The mold is heated to 160° Celcius (C.). A mixture of caprolactam monomer, lactam polymerization initiator and magnesium lactam polymerization catalyst, with or without 2-oxo-1-pyrrolidonyl compounds, is heated to about 80° C. and is introduced into the mold and the temperature response is recorded. The thermal trace starts an immediate rise due to heat contributed by the mold and the initial exotherm of the lactam polymerization. Before the temperature levels, a second sharp rise occurs, which is believed to be due to heat of crystallization and heat from the final stage of polymerization. The polymerization is considered to be complete when the temperature reaches a maximum and starts to fall. The mass is quite solid and the molded article may now be removed from the mold. The reaction time is the time interval between the addition of the reaction mixture to the mold and the attainment of maximum temperature. The overall reaction rate is considered to be proportional to the time for the temperature rise.

II. Adiabatic Exotherm Caprolactam monomer and lactam polymerization initiator, with or without 2-pyrrolidinone are admixed and heated to about 130° C. A 30 gauge iron constantan thermocouple is placed in the center of the mixture. A solution of magnesium lactam polymerization catalyst in caprolactam is also heated to about 130° C. and then added to this mixture. The reaction rate for the adiabatic exotherm is measured by determining the time for the exotherm to raise the temperature to 180° C. It is considered that when the temperature reaches 180° C. typically at the top of an "S" curve the reaction is essentially complete. The time to reach this point is used for comparison of different runs.

In preparing a nylon polymer, the reactant streams of $\epsilon$-caprolactam and $\epsilon$-caprolactam polymerization initiator or precursor thereof and of $\epsilon$-caprolactam and lactam magnesium halide polymerization catalyst are admixed to bring them into reactive contact at the polymerization temperature for example at a temperature in the range of from about 70° C. to about 230° C., preferably from about 90° C. to about 190° C., and more preferably, about 120° C. to about 180° C. In accordance with a particular method of preparing a nylon polymer, the above described admixture is immediately introduced into a mold which is maintained at the polymerization temperature until the caprolactam monomer has polymerized. The introduction of 2-pyrrolidinyl compound into the reaction mixture generally reduces the polymerization time at least about 50%. Typically, by selecting an acyllactam initiator, adjusting the polymerization temperature and/or by adjusting the amount of lactam magnesium halide polymerization catalyst or lactam polymerization initiator, the caprolactam monomer polymerization may be initiated and completed within a relatively short period of time of less than 5 minutes. However the introduction of 2-oxo-1-pyrrolidinyl compound as free 2-pyrrolidionone, or as a fraction or all of the lactam caps of the polymerization initiator or as a fraction or all of the lactam moiety of the polymerization catalyst, into the reaction mixture in either or both reactant streams as set forth above, can reduce the polymerization time to about 30 to 90 seconds and provides the opportunity to obtain a fast polymerization time with a substantially reduced catalyst concentration and hence allows improvement in the hydrolytic stability of the molded polymer.

When the polymerization is carried out in the presence of a hydroxy functional polymer or polyol, the polymerization is preferably carried out initially in the mold at a temperature of less than 120° C. and thereafter at a temperature in the range of about 120° to 180° C. Such a two step polymerization favors reaction of the hydroxy functional polymer or polyol with the initiator or initiator precursor in the initial step and ensures substantially complete incorporation of the hydroxy functional polymer or polyol in the block copolymer.

In the preparation of nylon polymers it may be desirable to conduct the polymerization reaction in the presence of one or more other materials conventionally incorporated in nylon block polymers. Such materials would include fillers, plasticizers, flame retardants, stabilizers, reinforcing agents such as glass fiber, graphite and mineral clay, dyes and pigmenting materials. Such materials may be conveniently introduced in either of the reactant streams provided that they do not interact with the initiator or catalyst and impair the rate of polymerization of the admixture.

The following examples are set forth to illustrate the present invention and should not be construed as limiting its scope. Quantities and percentages are by weight unless otherwise indicated.

EXAMPLES 1-14

Examples 1-14 illustrate the accelerating effect of pyrrolidone on $\epsilon$-caprolactam polymerization using $\epsilon$-caprolactam magnesium halide catalyst with acetyl caprolactam as the lactam polymerization promoter.

The polymerizations were run adiabatically in vacuum jars and the exotherm times were determined in the manner set forth hereinabove.

A 5-liter flask was charged with 3500 grams (gms) caprolactam which was dried by vacuum distillation of 100 gms. The resulting anhydrous caprolactam was kept under a dry nitrogren stream and continuously stirred at 130±5° C. For each example the appropriate amount of this dried caprolactam as indicated in Table I below was used.

A 0.67 molar solution of caprolactam magnesium bromide in caprolactam was prepared by charging to a 1-liter flask 319 gms of a 1.05 solution of caprolactam magnesium bromide in caprolactam and 181 gms dry caprolactam. The mixture was stirred under vacuum at 100° C. to thoroughly degas it. For each example the amount of this catalyst solution listed below in Table I was used.

For each example the polymerization was conducted by charging the respective amount of molten dried caprolactam into a preheated (130° C.) Dewar flask containing a magnetic stirring bar. The flask was covered with a plastic film and an iron-constantan thermocouple connected to a recording potentiometer was inserted into the center of the caprolactam. The flask containing the caprolactam was then charged with the amount of 2-pyrrolidinone and acetyl caprolactam indicated in Table I for each example and the resulting mixture was agitated with the magnetic stirrer. The temperature of the mixture was adjusted to about 120° C. The respective amounts of the catalyst solution for each example was then heated to 130° C., and charged to the respective flasks. For each example, approximately 226 gms (2 moles) of caprolactam were polymerized.

TABLE I

PYRROLIDINONE ACTIVATED CAPROLACTAM POLYMERIZATION

| Ex. No. | Caprolactam gms | Pyrrolidone ml | Initiator[1] ml | Catalyst[2] ml |
|---|---|---|---|---|
| 1 | 211 | 0 | 1.4 | 15 |
| 2 | 211 | .38 | 1.4 | 15 |
| 3 | 211 | .76 | 1.4 | 15 |
| 4 | 211 | 1.53 | 1.4 | 15 |
| 5 | 211 | 0 | 2.8 | 15 |
| 6 | 211 | .38 | 2.8 | 15 |
| 7 | 211 | .76 | 2.8 | 15 |
| 8 | 211 | .53 | 2.8 | 15 |
| 9 | 211 | 3.05 | 1.4 | 15 |
| 10 | 196 | 0 | 1.4 | 30 |
| 11 | 196 | .38 | 1.4 | 30 |
| 12 | 196 | .76 | 1.4 | 30 |
| 13 | 196 | 1.53 | 1.4 | 30 |
| 14 | 196 | 3.05 | 1.4 | 30 |

[1]Initiator - Acetyl Caprolactam
[2]Catalyst Concentration - 0.67 Mols/Kg.

For each example, the resulting adiabatic exotherm time was determined as discussed above. The exotherm time, the respective mole percent of catalyst, initiator and pyrrolidinone for each example and the percentage of pyrrolidinone based on the acyl lactam groups (% pyrrolidinone) are listed below in Table II.

TABLE II

EFFECT OF 2-PYRROLIDINONE ON POLYMERIZATION RATE OF ε-CAPROLACTAM

| Ex. No. | Catalyst Mole-% | Initiator Mole-% | Pyrrolidinone Mole-% | 180° C. Exotherm Time-Seconds |
|---|---|---|---|---|
| 1 | 0.5 | 0.5 | 0 | 243 |
| 2 | 0.5 | 0.5 | .25 | 250 |
| 3 | 0.5 | 0.5 | .5 | 169 |
| 4 | 0.5 | 0.5 | 1.0 | 86 |
| 5 | 0.5 | 1.0 | 0 | 128 |
| 6 | 0.5 | 1.0 | .25 | 118 |
| 7 | 0.5 | 1.0 | .5 | 113 |
| 8 | 0.5 | 1.0 | 1.0 | 82 |
| 9 | 0.5 | 1.0 | 2.0 | 86 |
| 10 | 1.0 | 0.5 | 0 | 194 |
| 11 | 1.0 | 0.5 | .25 | 136 |
| 12 | 1.0 | 0.5 | .5 | 113 |
| 13 | 1.0 | 0.5 | 1.0 | 113 |
| 14 | 1.0 | 0.5 | 2.0 | 89 |

EXAMPLES 15-20

Examples 15-20 illustrate the accelerating effect of 2-pyrrolidinone on systems comprising an isocyanate initiator precursor.

For each example a 500 ml flask, equipped with stirrer, thermometer, nitrogen inlet and distilling head was charged with 225 gms caprolactam. The caprolactam was dried by distilling off 25 ml of material under vacuum. The caprolactam was then cooled to 100° C. Toluene diisocyanate and 2-pyrrolidinone were added to the dried caprolactam in amount for each example shown in Table III below.

A master catalyst solution was prepared by charging 252 gms of 1.05 molar solution of caprolactam magnesium bromide (CMB) in caprolactam and 272 gms of molten anhydrous caprolactam. The mixture was degassed under vacuum and held at 100° C. until used. The final catalyst solution contained 0.53 moles of ε-caprolactam magnesium bromide per kg solution. The amount of this catalyst solution used for each of the respective examples is listed in Table III below.

TABLE III

LACTAM POLYMERIZATION WITH ISOCYANATE INITIATOR PRECURSOR

| | Amounts Added | | | Molar Concentration* | | |
|---|---|---|---|---|---|---|
| Ex. | ml Toluene Diisocyanate | ml 2-pyrrolidinone | ml Catalyst | % Toluene Diisocyanate | % 2-pyrrolidinone | % Catalyst |
| 15 | 1.9 | 0 | 50 | 0.6 | 0 | 1.2 |
| 16 | 1.9 | 1.0 | 50 | 0.6 | 0.6 | 1.2 |
| 17 | 1.9 | 2.0 | 50 | 0.6 | 1.2 | 1.2 |
| 18 | 1.7 | 0 | 23 | 0.6 | 0 | 0.6 |
| 19 | 1.7 | 0.9 | 23 | 0.6 | 0.6 | 0.6 |
| 20 | 1.7 | 1.8 | 23 | 0.6 | 1.2 | 0.6 |

*Molar concentration - Mole-% based on caprolactam.

The nylon material for each example was prepared by adding the catalyst solution to the respective solutions containing toluene diisocyanate, 2-pyrrolidinone and caprolactam to provide the concentrations listed in Table IV. The resulting mixture was stirred for 30 seconds and then after an additional 60 seconds this mixture was poured into a vertical mold which had been heated to 160° C. The dimensions of the mold were 10"×11"×0.125".

As Table IV shows, the caprolactam polymerizations were run at 2 levels of catalyst with 3 levels of pyrrolidinone for each catalyst level. The rate of caprolactam polymerization was calculated by measuring the standard exotherm time as described above. The results listed below in Table IV demonstrate the decrease in reaction time as a result of using 2-pyrrolidinone.

TABLE IV

EFFECT OF 2-PYRROLIDINONE ON ε-CAPROLACTAM POLYMERIZATION RATE

| Ex. | Mol-% Catalyst | Mol-% Pyrrolidone | Reaction Time-Seconds Exotherm |
|---|---|---|---|
| 15 | 1.2 | 0 | 838 |
| 16 | 1.2 | 0.6 | 529 |
| 17 | 1.2 | 1.2 | 452 |
| 18 | 0.6 | 0 | 1220 |
| 19 | 0.6 | 0.6 | 945 |
| 20 | 0.6 | 1.2 | 668 |

The nylon polymer prepared for each example was tested for various properties substantially in accordance with the following procedures:

| Tensile Strength: | ASTM D1708 | [units are pounds per square inch (psi) or megapascals (MPa)] |
|---|---|---|
| Tensile Elongation: | ASTM D638 | [units in %] |
| Notched Izod Impact: | ASTM D256 | [units are foot-pounds per inch notch (ft.lbs./in.) or joules per meter (J/m)]. |

The results of this testing are shown in Table V below:

TABLE V

| Ex. No. | TENSILE | | | Izod |
| --- | --- | --- | --- | --- |
| | Strength-PSI(MPa) | Elongation % | ft-lbs | (J/m) |
| 15 | 10650 (73.4) | 26 | 0.9 | (48.0) |
| 16 | 10200 (70.3) | 38 | 0.7 | (37.4) |
| 17 | 10300 (71.0) | 31 | 0.8 | (43.7) |
| 18 | 10260 (70.7) | 24 | 0.6 | (32.0) |
| 19 | 8370 (57.7) | 65 | 0.6 | (32.0) |
| 20 | 9320 (64.3) | 45 | 0.7 | (37.4) |

We claim:

1. A storage stable composition suitable for admixing with a catalytically effective amount of a $C_3$ to $C_{12}$ lactam magnesium halide to provide an admixture which polymerizes to form a nylon-6 polymer, said composition comprising (a) ε-caprolactam, (b) an effective amount of an initiator compound or precursor thereof, said initiator coreactant compound being capped with at least one activated group capable of initiating ε-caprolactam polymerization in the presence of the catalyst, and (c) a sufficient amount of 2-oxo-1-pyrrolidinyl groups, present in the composition as 2-pyrrolidinone or as N-lactam groups of the initiator coreactant compound, to provide a concentration of 2-oxo-1-pyrrolidinyl groups in the range of about 0.05 to about two equivalents per equivalent of the initiator coreactant compound or precursor thereof.

2. The composition of claim 1 wherein the activated groups of the initiator coreactant are $C_3$ to $C_{12}$ N-lactam groups, activated by attachment to a moiety selected from the group consisting of

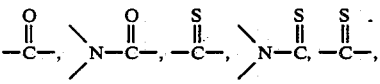

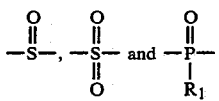

wherein $R_1$ is selected from the group consisting of alkyl, aryl, aralkyl, alkyloxy, aryloxy or aralkyloxy groups.

3. The composition of claim 2 wherein the initiator coreactant compound contains from 2 to 9 activated N-lactam groups per molecule.

4. The composition of claim 2 wherein the initiator coreactant precursor is an acid halide, a chloroformate, a ketene, an isocyanate or a cyclic imide.

5. The composition of claim 2 wherein the lactam polymerization initiator coreactant is an acyllactam derived from an acid selected from the group consisting of acetic, benzoic, carbonic, oxalic, malonic, glutaric, adipic, pimelic, azelaic, sebacic, isophthalic and terephthalic acids.

6. The composition of claim 2 wherein the activated N-lactam group of the initiator coreactant compound is derived from a lactam selected from the group consisting of ε-caprolactam and 2-pyrrolidinone.

7. The composition of claim 2 wherein the activated N-lactam group of the initiator coreactant compound is derived from 2-pyrrolidinone.

8. A storage stable composition suitable for admixing with an effective amount of an ε-caprolactam polymerization initiator coreactant or precursor thereof to provide an admixture which polymerizes to form a nylon-6 polymer, said composition comprising ε-caprolactam, a catalytically effective amount of a lactam magnesium halide of a $C_3$ to $C_{12}$ lactam, and a sufficient amount of 2-oxo-1-pyrolidinyl groups present in the composition as 2-pyrrolidinone or as 2-oxo-1-pyrrolidinyl magnesium halide to provide in the admixture a concentration of 2-oxo-1-pyrrolidinyl groups in the range of about 0.05 to about two equivalents per equivalent of the initiator coreactant compound or precursor thereof.

9. The composition of claim 8 wherein the lactam magnesium halide is derived from a lactam selected from the group consisting of ε-caprolactam and 2-pyrrolidinone.

10. The composition of claim 8 wherein the lactam magnesium halide is 2-oxo-1-pyrrolidinyl magnesium bromide.

11. A process for preparation of a nylon-6 polymer which comprises bringing into polymerizing admixture a first reactant stream comprising ε-caprolactam, an effective amount of an ε-caprolactam polymerization initiator coreactant or precursor thereof and up to about two equivalents 2-pyrrolidinone per equivalent of an initiator coreactant and a second reaction stream comprising ε-caprolactam, a catalytically effective amount of a $C_3$ to $C_{12}$ lactam magnesium halide and up to about two equivalents 2-pyrrolidinone per equivalent of the initiator coreactant, wherein the ε-caprolactam polymerization initiator coreactant is a compound capped with at least one activated group capable of initiating ε-caprolactam polymerization in the presence of the catalyst, and comprises segments which provide elastomeric blocks in the nylon-6 block copolymer and wherein the admixture comprises a sufficient amount of 2-oxo-1-pyrrolidinyl compounds selected from the group consisting of 2-pyrrolidinone, 2-oxo-1-pyrrolidinyl magnesium halide and 2-oxo-1-pyrrolidinyl capped initiator coreactant compound to provide a concentration in the admixture of 2-oxo-1-pyrrolidinyl group in the range of about 0.05 to about two equivalents per equivalent of the total ε-caprolactam polymerization initiator coreactant or precursor thereof.

12. The process of claim 11 wherein the activated groups of the initiator coreactant are $C_3$ to $C_{12}$ N-lactam groups activated by attachment to a moiety selected from the group consisting of

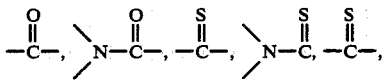

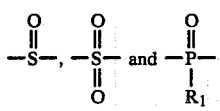

wherein $R_1$ is selected from the group consisting of alkyl, aryl, aralkyl, alkyloxy, aryloxy or aralkyloxy groups.

13. The process of claim 12 wherein the initiator coreactant compound contains from 2 to 9 activated N-lactam groups per molecule.

14. The process of claim 12 wherein the precursor of the initiator coreactant is an acid halide, a chloroformate, a ketene, an isocyanate or a cyclic imide.

15. The process of claim 12 wherein the lactam polymerization initiator coreactant is an acyllactam derived from an acid selected from the group consisting of acetic, benzoic, carbonic, oxalic, glutaric, adipic, pimelic, azelaic, sebacic, isophthalic and terephthalic acids.

16. The process of claim 12 wherein the N-lactam groups of the initiator coreactant are derived from a lactam selected from the group consisting of ε-caprolactam and 2-pyrrolidinone.

17. The process of claim 12 wherein the activated N-lactam group of the initiator coreactant compound is derived from 2-pyrrolidinone.

18. The process of claim 11 wherein the lactam magnesium halide is derived from a lactam selected from the group consisting of ε-caprolactam and 2-pyrrolidinone.

19. The process of claim 12 wherein the lactam magnesium halide is 2-oxo-1-pyrrolidinyl magnesium bromide.

20. A polymerizing admixture comprising ε-caprolactam, an effective amount of an ε-caprolactam polymerization initiator coreactant, or precursor thereof, a catalytically effective amount of a $C_3$ to $C_{12}$ lactam magnesium halide and up to about two equivalents 2-pyrrolidinone per equivalent of the initiator coreactant wherein the ε-caprolactam polymerization initiator coreactant is a compound capped with at least one activated group capable of initiating ε-caprolactam polymerization in the presence of the catalyst, wherein the admixture comprises a sufficient amount of 2-oxo-1-pyrrolidinyl compounds selected from the group consisting of 2-pyrrolidinone, 2-oxo-1-pyrrolidinyl magnesium halide and 2-oxo-1-pyrrolidinyl capped initiator coreactant compound to provide a concentration of 2-oxo-1-pyrrolidinyl group in the range of about 0.05 to about two equivalents per equivalent of the total ε-caprolactam polymerization initiator coreactant or precursor thereof and wherein, when the initiator coreactant compound is a polyacyllactam of molecular weight less than 400 and the catalyst is 2-oxo-1-pyrrolidinyl magnesium halide, at least 10 percent of the 2-oxo-1-pyrrolidinyl groups are supplied by 2-pyrrolidinone or by the initiator coreactant compound.

21. The admixture of claim 20 wherein the activated groups of the initiator coreactant are $C_3$ to $C_{12}$ N-lactam groups activated by attachment to a moiety selected from the group consisting of

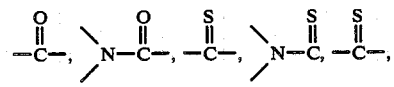

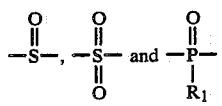

wherein $R_1$ is selected from the group consisting of alkyl, aryl, aralkyl, alkyloxy, aryloxy or aralkyloxy groups.

22. The admixture of claim 21 wherein the initiator coreactant compound contains from 2 to 9 activated N-lactam groups per molecule.

23. The admixture of claim 21 wherein the initiator coreactant precursor is an acid halide, a chloroformate, a ketene, an isocyanate or a cyclic imide.

24. The admixture of claim 21 wherein the lactam polymerization initiator coreactant is an acyllactam derived from an acid selected from the group consisting of acetic, benzoic, carbonic, oxalic, malonic, succinic, glutaric, adipic, pimelic, azelaic, sebacic, isophthalic and terephthalic acids.

25. The admixture of claim 21 wherein the activated N-lactam group of the initiator coreactant compound is derived from a lactam selected from the group consisting of ε-caprolactam and 2-pyrrolidinone.

26. The admixture of claim 21 wherein the activated N-lactam group of the initiator coreactant compound is derived from 2-pyrrolidinone.

27. The admixture of claim 20 wherein the lactam magnesium halide is derived from a lactam selected from the group consisting of ε-caprolactam and 2-pyrrolidinone.

28. The admixture of claim 21 wherein the lactam magnesium halide is 2-oxo-1-pyrrolidinyl magnesium bromide.

29. A storage stable two component system comprising a first solution and a second solution which upon mixing polymerize to form a nylon-6 polymer, wherein the first solution comprises ε-caprolactam, an effective amount of an ε-caprolactam polymerization initiator coreactant or precursor thereof and up to about two equivalents 2-pyrrolidinone per equivalent of the initiator coreactant, wherein the second solution comprises ε-caprolactam, a catalytically effective amount of a $C_3$ to $C_{12}$ lactam magnesium halide and up to about two equivalents 2-pyrrolidinone per equivalent of the initiator coreactant, wherein the ε-caprolactam initiator coreactant is a compound capped with at least one activated group capable of initiating ε-caprolactam polymerization in the presence of the catalyst, wherein the first and second solutions comprise a sufficient amount of 2-oxo-1-pyrrolidinyl compounds selected from the group consisting of 2-pyrrolidinone, 2-oxo-1-pyrrolidinyl magnesium halide and 2-oxo-1-pyrrolidinyl capped initiator coreactant compound to provide in the admixture of the first and second solutions a concentration of 2-oxo-1-pyrrolidinyl group in the range of about 0.05 to about two equivalents per equivalent of the total ε-caprolactam polymerization initiator coreactant or precursor thereof and wherein, when the initiator coreactant compound is a polyacyllactam of molecular weight less than 400 and the catalyst is 2-oxo-1-pyrrolidinyl magnesium halide, at least 10 percent of the 2-oxo-1-pyrrolidinyl groups are supplied by 2-pyrrolidinone or by the initiator coreactant compound.

30. The system of claim 29, wherein the activated groups of the initiator coreactant are $C_3$ to $C_{12}$ N-lactam groups activated by attachment to a moiety selected from the group consisting of

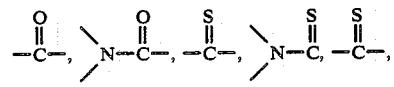

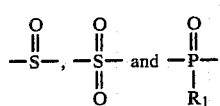

wherein $R_1$ is selected from the group consisting of alkyl, aryl, aralkyl, alkyloxy, aryloxy or aralkyloxy groups.

31. The system of claim 30 wherein the initiator coreactant compound contains from 2 to 9 activated N-lactam groups per molecule.

32. The system of claim 30 wherein the lactam polymerization initiator coreactant is an acyllactam derived from an acid selected from the group consisting of acetic, benzoic, carbonic, oxalic, glutaric, adipic, pimelic, azelaic, sebacic, isophthalic and terephthalic acids.

33. The system of claim 30 wherein the N-lactam groups of the initiator coreactant are derived from a lactam selected from the group consisting of $\epsilon$-caprolactam and 2-pyrrolidinone.

34. The system of claim 30 wherein the activated N-lactam group of the initiator coreactant compound is derived from 2-pyrrolidinone.

35. The system of claim 30 wherein the lactam magnesium halide is derived from a lactam selected from the group consisting of $\epsilon$-caprolactam and 2-pyrrolidinone.

36. The composition of claim 1 wherein the nylon-6 polymer is a block polymer containing blocks provided by a hydroxy functional polymer, and wherein the composition contains the hydroxy functional polymer in less than the stoichiometric amount for reaction with the initiator coreactant.

37. The process of claim 11 wherein the nylon-6 polymer is a block polymer containing blocks provided by a hydroxy functional polymer and wherein the first reactant stream contains the hydroxy functional polymer in less than the stoichiometric amount for reaction with the initiator coreactant.

38. The system of claim 29 wherein the nylon-6 polymer is a block polymer containing blocks provided by a hydroxy functional polymers and wherein the first solution contains the hydroxy functional polymer in less than the stoichiometric amount for reaction with the initiator, with the provision that when the hydroxy functional polymer is polyoxypropylene triol, the initiator coreactant is not 2,5-difluoroterephthaloyl bis(2-pyrrolidinone).

* * * * *